UNITED STATES PATENT OFFICE.

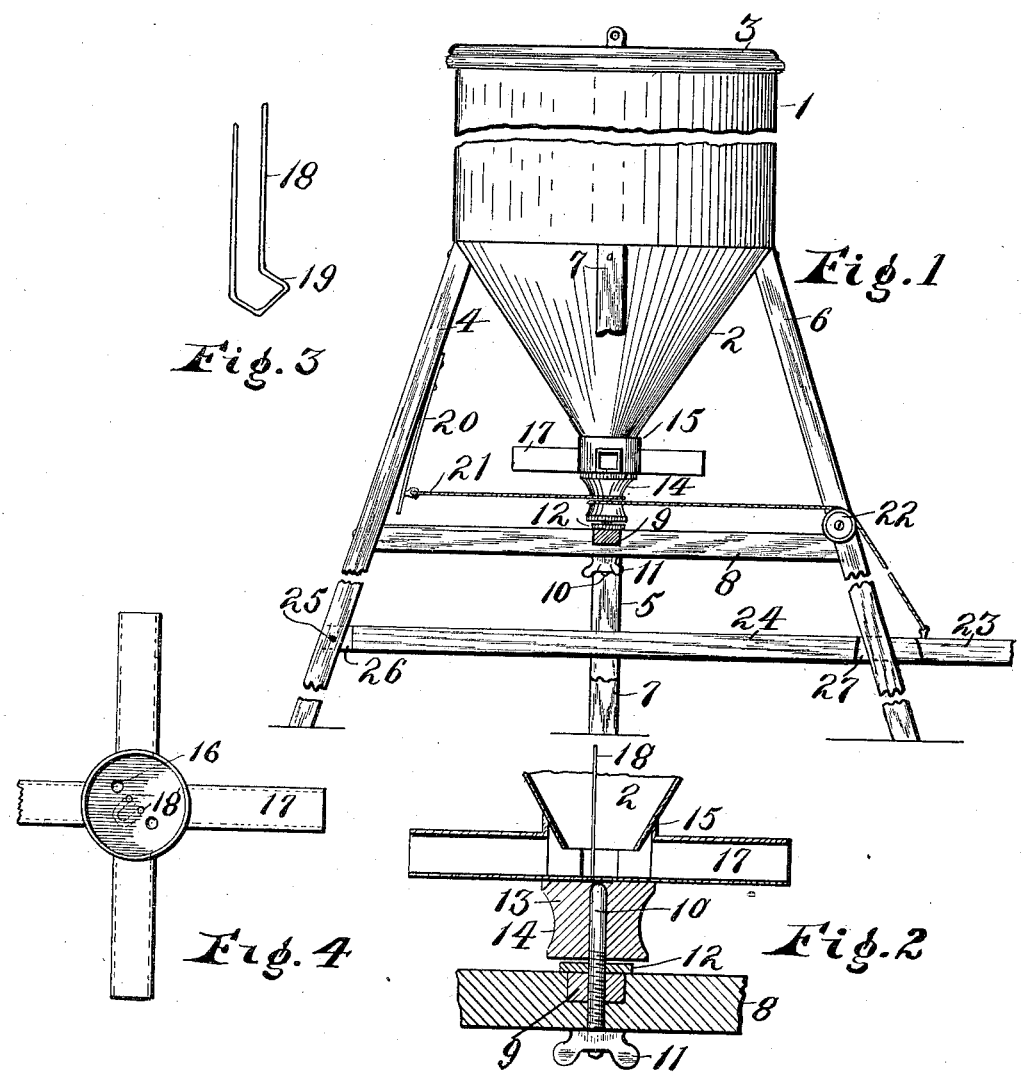

CLARK LEROY TAWNEY, OF BARBERTON, OHIO.

POULTRY-FEEDER.

1,078,646.  Specification of Letters Patent.  Patented Nov. 18, 1913.

Application filed January 22, 1912. Serial No. 672,632.

*To all whom it may concern:*

Be it known that I, CLARK LEROY TAWNEY, a citizen of the United States, residing at Barberton, in the county of Summit and State of Ohio, have invented new and useful Improvements in Poultry-Feeders, of which the following is a specification.

This invention relates to poultry feeders adapted to be operated by the fowls without the necessity of personal attendance thereon, and the object thereof is, broadly speaking, to provide a feed distributer for poultry which can be operated by the fowls themselves and which will distribute the feed over a considerable area so that they will obtain some exercise while in pursuit of their food, thereby accomplishing the two-fold object of feeding them and also inducing a requisite amount of exercise.

More specifically, the invention comprises a feed supply-tank below which is a receiving receptacle provided with laterally-extending hollow arms into which the feed passes and which are caused to revolve by the poultry stepping or perching on a pivoted lever, the weight of the fowl depressing the lever and causing a rotary movement of the receptacle, sufficient to widely distribute the feed, the movement of the lever under the weight of the fowl arranged to actuate the receptacle in one direction and the lever is returned to its normal position through the medium of a resilient member which reverses the rotation of the receptacle.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modification can be resorted to which come within the scope of the claim hereunto appended.

In the drawings in which similar reference numerals indicate like parts in the different figures, Figure 1, is a view in side elevation of a poultry-feeder embodying this invention with portions thereof broken away to more clearly illustrate the construction thereof; Fig. 2, is a central, longitudinal, sectional view of certain portions of the mechanism employed; Fig. 3, is a view of an agitator employed in the device for insuring the continuance of the feed from the supply-tank to the receptacle; and, Fig. 4, is a plan view of the receptacle.

Referring to the drawings in detail the reference numeral 1 denotes a feed supply-tank provided with an inverted conically-formed portion 2, and usually provided with a cover 3. The tank is supported through the medium of four legs 4, 5, 6 and 7. Extending between the legs 4 and 6 is a cross-arm 8 and extending between the legs 5 and 7 and at right-angles to the arm 8 is a similar cross-arm 9. These two arms have cut-away portions at their centers adapted to interlock as shown in Fig. 1. In the intersecting portions of the cross-arms 8 and 9 is a vertical opening in which is mounted a pin 10 the lower end of which is threaded to receive a thumb-nut 11 and also a clamping nut 12 by which the pin 10 is supported in an upright position by engagement with the cross-arms 8 and 9. Rotatably mounted on the pin 10 is a roller 13 provided with a concave periphery 14 for a purpose to be later described.

Mounted on the upper face of the roller 13 is a cup-shaped receptacle 15 having in its lower wall a pair of apertures 16 through which hold-fast devices may be passed for securing it to the roller 13. The side wall of the receptacle 15 is preferably cylindrical and is adapted to inclose the lower discharge end of the conical portion 2 of the feed supply-tank 1 and to contact therewith sufficiently snugly to prevent the escape of food. The receptacle 15 is provided with a plurality of laterally-projecting hollow arms 17 preferably square in cross-section and with their interiors in open communication with the interior of the receptacle 15. The receptacle 15 is adapted to receive the feed from the tank 1 and in order to insure the continuance of this feed an agitator is employed which comprises a U-shaped member 18 having a laterally-bent portion 19 at the lower end. This U-shaped member is positioned by passing the ends thereof through suitable openings in the lower wall of the receptacle 15 and by securing the lower portion 19 thereof to the under face of the receptacle by means of solder or other securing medium.

Secured to one of the legs adjacent to the lower end of the tank 1 is a resilient member 20 so held that one end is free to yield or bend horizontally toward or away from the roller 13. Secured to the lower free end of the resilient member 20 is a flexible member such as a cord 21 which is wrapped one or more times around the concave periphery 14 of the roller 13 and from thence is carried over a sheave or grooved pulley 22 and its end is secured to the free end 23 of a vertically-movable lever 24, the opposite end of which is pivoted at 25 to the leg 4. This lever is preferably provided with a cut-away portion 26 where it engages the leg 25 and also with a cut-away portion 27 to receive the leg 6.

In operation the tank is supplied with poultry food and the parts being in the position shown in Fig. 1, the end 23 of the lever 24 constitutes a vertically oscillatory perch and as this end 23 projects in a convenient manner the natural instinct of the fowls will be to alight upon the end 23 as a perch, in doing which their weight will depress the end 23 sufficiently to cause a rotation of the roller 13 and the receptacle 15 which is united thereto. It is contemplated that the end 23 of the lever 24 will normally lie about 5 or 6 inches from the ground and by the time the end 23 has been depressed a sufficient distance to impart a rotary motion to the receptacle, the motion causes the feed in the receptacle to pass outwardly through the arms 17, scattering it broad-cast, which attracts the fowls away from the lever and as their weight is removed from the end of the lever, the latter is returned to its normal position through the medium of the resilient element 20, causing a rapid reverse rotation of the receptacle 15 which thereby produces a second or renewed distribution of a fresh supply of food. It will be thus seen without going farther that at each and every time a fowl alights on the lever 23 the food will be distributed over a large area surrounding the device and at a considerable distance therefrom so as to cause the fowls to do more or less running or walking for the purpose of satisfying their appetites, to thereby induce helpful and much needed exercise.

I claim:

A poultry feeder comprising in combination a feed tank provided with a discharge opening at its lower end, supporting legs for said tank, a cross-bar supported by said legs and provided at its median portion with a vertical aperture, a threaded pin in said aperture and adapted to constitute a pivot, a locking nut and a thumb nut mounted on the threaded portion of said pin and arranged respectively on the upper and lower faces of said cross-bar for holding said pin in an adjusted position vertically with respect to said tank, a roller having a concave outer face pivotally mounted on said pin, a receptacle mounted on said roller below the opening in said tank and capable of vertical adjustment with respect to said tank through the medium of said pin, said receptacle provided with a horizontal radially-extending discharge tube, a spring secured to one of said supporting legs, a pulley supported on one of said legs, a lever similarly mounted, and a flexible member extending from the free end of said spring around said roller and said pulley and connected at its opposite end with the oscillatory end of said lever, whereby when said lever is oscillated said flexible member is caused to rotate said roller and receptacle to widely distribute the feed from said radial tube.

In testimony whereof I have hereunto set my hand in presence of two subscribing witnesses.

CLARK LEROY TAWNEY.

Witnesses:
C. E. HUMPHREY,
A. L. McCLINTOCK.

Copies of this patent may be obtained for five cents each, by addressing the "Commissioner of Patents, Washington, D. C."